United States Patent
Jansson et al.

(10) Patent No.: US 11,862,187 B2
(45) Date of Patent: *Jan. 2, 2024

(54) SYSTEMS AND METHODS FOR JOINTLY ESTIMATING SOUND SOURCES AND FREQUENCIES FROM AUDIO

(71) Applicant: Spotify AB, Stockholm (SE)

(72) Inventors: Andreas Jansson, New York, NY (US); Rachel Bittner, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,471

(22) Filed: May 23, 2022

(65) Prior Publication Data

US 2022/0351747 A1 Nov. 3, 2022

Related U.S. Application Data

(63) Continuation of application No. 16/596,554, filed on Oct. 8, 2019, now Pat. No. 11,355,137.

(51) Int. Cl.
*G10L 25/51* (2013.01)
*G06N 20/00* (2019.01)
(Continued)

(52) U.S. Cl.
CPC .............. *G10L 25/51* (2013.01); *G06N 3/045* (2023.01); *G06N 3/08* (2013.01); *G06N 20/00* (2019.01); *H04L 65/75* (2022.05)

(58) Field of Classification Search
None
See application file for complete search history.

(56) References Cited

U.S. PATENT DOCUMENTS 6,710,822 B1  3/2004  Walker
7,333,864 B1  2/2008  Herley
(Continued)

FOREIGN PATENT DOCUMENTS

CN  107093419 A  8/2017
CN  109272975 A  1/2019
(Continued)

OTHER PUBLICATIONS

Bretan et al., "Learning Semantic Similarity in Music Via Self-Supervision," Proceedings of the 20th ISMIR Conference, Delft, Netherlands, Nov. 4-8, 2019, 8 pgs.
(Continued)

*Primary Examiner* — Quynh H Nguyen
(74) *Attorney, Agent, or Firm* — Morgan, Lewis & Bockius LLP

(57) ABSTRACT

An electronic device receives a first audio content item that includes a plurality of sound sources. The electronic device generates a representation of the first audio content item. The electronic device determines, from the representation of the first audio content item: a representation of an isolated sound source, and frequency data associated with the isolated sound source. Determining the representation of the isolated sound source and the frequency data associated with the isolated sound source includes using a neural network to jointly determine the representation of the isolated sound source and the frequency data associated with the isolated sound source. The electronic device determines that a portion of a second audio content item matches the first audio content item using the representation of the isolated sound source and/or the frequency data associated with the isolated sound source.

20 Claims, 9 Drawing Sheets

(51) Int. Cl.
*G06N 3/08* (2023.01)
*H04L 65/75* (2022.01)
*G06N 3/045* (2023.01)

(56) References Cited

U.S. PATENT DOCUMENTS

| | | | |
|---|---|---|---|
| 7,974,838 | B1 | 7/2011 | Lukin et al. |
| 8,977,374 | B1* | 3/2015 | Eck .......................... G06F 16/61 |
| | | | 708/814 |
| 9,325,641 | B2 | 4/2016 | Haramaty et al. |
| 10,141,010 | B1 | 11/2018 | Nichols |
| 10,248,664 | B1* | 4/2019 | Shen ....................... G06V 20/10 |
| 10,257,072 | B1 | 4/2019 | Salam |
| 10,685,634 | B2 | 6/2020 | Salazar et al. |
| 10,809,890 | B1 | 10/2020 | Krawczyk |
| 2002/0099552 | A1 | 7/2002 | Rubin et al. |
| 2003/0233930 | A1 | 12/2003 | Ozick |
| 2004/0030691 | A1 | 2/2004 | Woo |
| 2005/0174923 | A1 | 8/2005 | Bridges |
| 2007/0083365 | A1 | 4/2007 | Shmunk |
| 2007/0119292 | A1 | 5/2007 | Nakamura |
| 2007/0124293 | A1 | 5/2007 | Lakowske et al. |
| 2008/0072741 | A1 | 3/2008 | Ellis |
| 2009/0317783 | A1 | 12/2009 | Noguchi |
| 2010/0169085 | A1 | 7/2010 | Ranga Rao et al. |
| 2014/0115465 | A1 | 4/2014 | Lee et al. |
| 2014/0129235 | A1 | 5/2014 | Suvanto |
| 2016/0358594 | A1 | 12/2016 | Hilderman et al. |
| 2017/0292853 | A1 | 10/2017 | Bostick et al. |
| 2018/0122403 | A1 | 5/2018 | Koretzky et al. |
| 2018/0182366 | A1 | 6/2018 | Salazar et al. |
| 2018/0210952 | A1 | 7/2018 | Takano |
| 2019/0180142 | A1 | 6/2019 | Lim et al. |
| 2019/0208320 | A1 | 7/2019 | Takahashi et al. |
| 2019/0213279 | A1 | 7/2019 | Kim |
| 2019/0228312 | A1 | 7/2019 | Andoni et al. |
| 2020/0021873 | A1 | 1/2020 | Swaminathan |
| 2021/0005180 | A1 | 1/2021 | Kim |
| 2021/0407532 | A1 | 12/2021 | Salahuddin et al. |

FOREIGN PATENT DOCUMENTS

| | | | |
|---|---|---|---|
| WO | WO2018/047643 | A1 | 3/2018 |
| WO | WO2019/000054 | A1 | 1/2019 |

OTHER PUBLICATIONS

Chen et al., "Playing Technique, Classification Based on Deep Collaborative Learning of Variational Auto-Encoder and Gaussian Process," © 2018 IEEE, downloaded on Sep. 11, 2021 from IEEE Xplore, 6 pgs.

Emanuele Pollastri, "A Pitch Tracking Voice for Music Retrieval," IEEE, Sep. 2002, pp. 341-344 (Year: 2002).

Jansson, "Joint Singing Voice Separation and F0 Estimation with Deep U-Net Architectures," Nov. 18, 2019, https://ieeexplore.ieee.org/document/4694852, 5 pgs.

Jansson, "Singing Voice Separation with Deep U-Net Convolutional Networks," Oct. 23-27, 2017, Proceedings of the 18th ISMIR Conference, Suzhou, China, 7 pgs.

Jansson, Office Action, U.S. Appl. No. 16/596,554, dated Oct. 25, 2021, 7 pgs.

Kumar, Office Action, US6/880,908, dated Jun. 7, 2021, 43 pgs.

Kumar, Office Action, US6/880,908, dated Sep. 21, 2021, 7 pgs.

Kumar, Final Office Action, US6/880,908, dated Oct. 4, 2021, 6 pgs.

Marchini, Office Action, U.S. Appl. No. 16/719,779, dated Nov. 2, 2021, 10 pgs.

Luo, et al., "Learning Domain-Adaptive Latent Representations of Music Signals Using Variational Autoencoders," Proceedings of the 19th ISMIR Conference, Paris, France, Sep. 23-27 2018, 8 pgs.

Roche et al., "Autoencoders for music sound modeling: a comparison of linear, shallow, deep, recurrent and variational models," © 2019 Roche et al., arXiv:1806.04096v2 [eess.AS] May 24, 2019, 8 pgs.

Salamon, Melody, bass line, and harmony representations for music version identification, Proceeding of the 21st International World Wide Conference, Apr. 16, 2012, 8 pgs.

Singh, "Identifying the Genre of a Song with Neural Networks," Oct. 21, 2018, downloaded from https://medium.com/@navdeepsingh_2336/identifying-the-genre-of-a-song-with-neural-networks-851db89c42f0, 13 pgs.

Spotify AB, Extended European Search Report, EP20191993.3, dated Feb. 12, 2021, 8 pgs.

Spotify AB, Extended European Search Report, EP20212961.5, dated May 6, 2021, 5 pgs.

Stoller, "Wave-U-Net: A Multi-Scale Neural Network for End-to-End Audio Source Separation," 19th International Society for Music Information Retrieval Conference, Paris, France, Jun. 8, 2018, 7 pgs.

Uhlich, Improving Music Source Separation Based on Deep Neural Networks Through Data Augmentation and Network Blending, ICASSP 2017, © 2017 IEEE, 5 pgs.

Yu, "A Query-by-Singing System for Retrieving Karaoke Music," IEEE Transactions on Multimedia, vol. 10, Issue 8, Dec. 12, 2008, 12 pgs.

Kumar, Notice of Allowance, U.S. Appl. No. 16/880,908, dated Dec. 24, 2021, 8 pgs.

Kumar, Office Action, U.S. Appl. No. 17/719,250, dated May 10, 2023, 23 pgs.

Marchini, Notice of Allowance, U.S. Appl. No. 16/719,779, dated Feb. 23, 2022, 7 pgs.

Spotify AB, Decision to Grant, EP20191993.3, dated Jun. 22, 2023, 2 pgs.

Spotify AB, Decision to Grant, EP20212961.5, dated Apr. 26, 2022, 2 pgs.

Kumar, Notice of Allowance, U.S. Appl. No. 17/719,250, dated Aug. 31, 2023, 9 pgs.

* cited by examiner

SYSTEMS AND METHODS FOR JOINTLY ESTIMATING SOUND SOURCES AND FREQUENCIES FROM AUDIO

RELATED APPLICATIONS

This application is a continuation of U.S. application Ser. No. 16/596,554, filed Oct. 8, 2019, entitled "Systems and Methods for Jointly Estimating Sound Sources and Frequencies from Audio," which is herein fully incorporated by reference in its entirety.

TECHNICAL FIELD

The disclosed embodiments relate generally to media playback, and, in particular, to using a neural network to jointly extract a sound source from a mixed audio source and determine frequency data for the sound source.

BACKGROUND

Access to electronic media, such as music and video content, has expanded dramatically over time. As a departure from physical media, media content providers stream media to electronic devices across wireless networks, improving the convenience with which users can digest and experience such content.

A media content provider separately extracts vocal signals and determines fundamental frequency estimations for a media content item. The extracted vocal signals and fundamental frequency estimations are used in karaoke applications and in content recognition applications, such as genre recognition. For example, the media content provider separates vocal source signals from media content. The outputs of the vocal source separation system are used as inputs to the system to determine fundamental frequency estimations. Conversely, fundamental frequency estimations can be used in vocal extraction systems to improve vocal source separation. However, the system for performing vocal source separation is separate from the system for determining frequency estimations.

SUMMARY

Accordingly, there is a need for systems and methods for using a neural network to jointly isolate a sound source from a mixed audio source and determine frequency data associated with the isolated sound source.

In accordance with some embodiments, a method is performed at a first electronic device. The first electronic device has one or more processors and memory storing instructions for execution by the one or more processors. The method includes receiving a first audio content item that includes a plurality of sound sources. The method further includes generating a representation of the first audio content item. The method further includes determining, from the representation of the first audio content item, a representation of an isolated sound source, and frequency data associated with the isolated sound source. The determining includes using a neural network to jointly determine the representation of the isolated sound source and the frequency data associated with the isolated sound source.

In some embodiments, the method further includes, at the first electronic device, determining that a portion of a second audio content item matches the first audio content item by determining frequency data for a representation of the second audio content item and comparing the frequency data of the second audio content item with the frequency data of the first audio content item.

In some embodiments, the method further includes, at the first electronic device, determining that a portion of a third audio content item matches the first audio content item by determining a representation of the isolated sound source for the third audio content item and comparing the representation of the isolated sound source for the third audio content item with the representation of the isolated sound source of the first audio content item.

In some embodiments, the neural network comprises a plurality of U-nets.

In some embodiments, the neural network comprises a first source network, a first pitch network, a second source network, and a second pitch network. The second source network is fed a concatenation of an output of the first source network with an output of the first pitch network, and the output of the second source network is fed to the second pitch network.

In some embodiments, the neural network comprises a pitch network and a source network, and an output of the pitch network is fed to the source network.

In some embodiments, generating the representation of the first audio content item comprises determining a first set of weights for a source network of a source to pitch network; feeding a pitch network of the source to pitch network an output of the source network of the source to pitch network and determining a second set of weights for the pitch network of the source to pitch network.

In some embodiments, the isolated sound source comprises a vocal source.

In some embodiments, the isolated sound source comprises an instrumental source.

In accordance with some embodiments, a first electronic device (e.g., a server system, a client device, etc.) includes one or more processors and memory storing one or more programs configured to be executed by the one or more processors. The one or more programs further include instructions for receiving a first audio content item that includes a plurality of sound sources. The one or more programs further include instructions for generating a representation of the first audio content item. The one or more programs further include instructions for determining, from the representation of the first audio content item, a representation of an isolated sound source, and frequency data associated with the isolated sound source. The determining includes using a neural network to jointly determine the representation of the isolated sound source and the frequency data associated with the isolated sound source.

In accordance with some embodiments, a computer-readable storage medium has stored therein instructions that, when executed by a first electronic device, cause the first electronic device to receive a first audio content item that includes a plurality of sound sources. The instructions further cause the first electronic device to generate a representation of the first audio content item. The instructions further cause the first electronic device to determine, from the representation of the first audio content item, a representation of an isolated sound source, and frequency data associated with the isolated sound source. The determining includes using a neural network to jointly determine the representation of the isolated sound source and the frequency data associated with the isolated sound source.

Thus, systems are provided with improved methods for providing information associated with media content items based on a proxy media content item.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Figure 1:
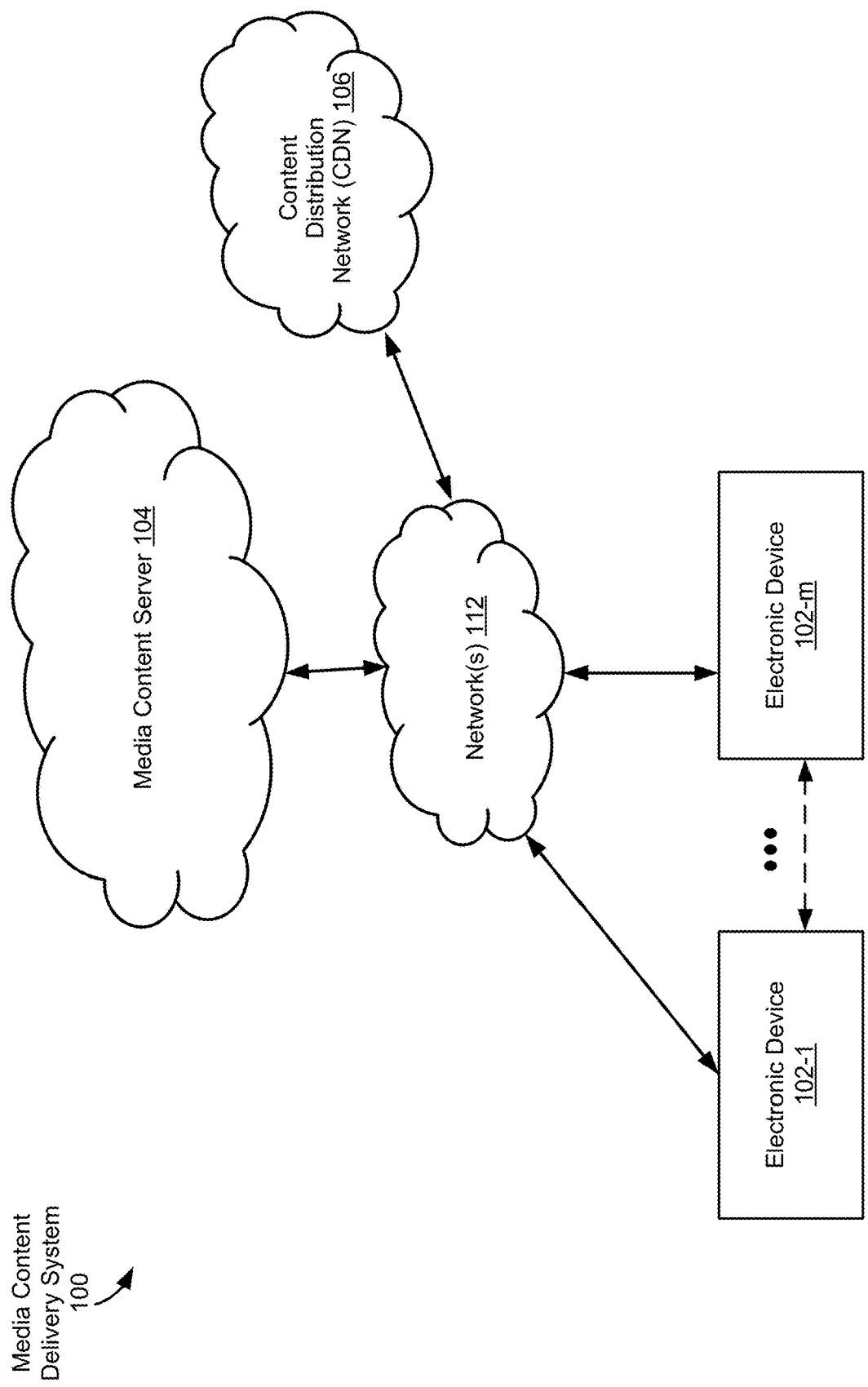
FIG. 1 is a block diagram illustrating a media content delivery system, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

A system is provided for extracting a sound source and frequency data from a mixed audio source. Many uses of audio content benefit from the ability to isolate a one or more sound sources (e.g., a vocal track or instrumental source) from audio content. For example, isolating a sound source is used in karaoke applications and in lyric determination applications. Similarly, there are benefits to estimating a fundamental frequency of a single sound source from audio content. For example, it is possible to determine when other audio content (e.g., cover songs) are related to the audio content by matching the fundamental frequencies of the audio content. Dependencies between the tasks of sound source isolation and frequency determination allow improved performance when the tasks are performed jointly. For example, jointly performed tasks are accomplished using a model that is trained to both isolate the sound source and determine one or more frequencies within the model. The weights of the model are trained to reflect the impact that the individual tasks have on each other. For example, instead of creating a model that is trained (e.g., optimized) to individually isolate sound source and a separate model that is trained (e.g., optimized) to individually determine frequencies, a joint model is created where these two tasks are optimized together. A neural network model is trained to simultaneously isolate a sound source and determine frequencies over time of the sound source. In some embodiments, the neural network model comprises an Artificial Neural Network (ANN).

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-*m* are the same type of device (e.g., electronic device 102-1 and electronic device 102-*m* are both speakers). Alternatively, electronic device 102-1 and electronic device 102-*m* include two or more different types of devices.

In some embodiments, electronic devices 102-1 and 102-*m* send and receive media-control information through network(s) 112. For example, electronic devices 102-1 and 102-*m* send media control requests (e.g., requests to play music, movies, videos, or other media items, or playlists thereof) to media content server 104 through network(s) 112. Additionally, electronic devices 102-1 and 102-*m*, in some embodiments, also send indications of media content items to media content server 104 through network(s) 112. In some embodiments, the media content items are uploaded to electronic devices 102-1 and 102-*m* before the electronic devices forward the media content items to media content server 104.

In some embodiments, electronic device 102-1 communicates directly with electronic device 102-*m* (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-*m*. In some embodiments, electronic device 102-1 communicates with electronic device 102-*m* through network(s) 112. In some embodiments, electronic device 102-1 uses the direct connection with electronic device 102-*m* to stream content (e.g., data for media items) for playback on the electronic device 102-*m*.

In some embodiments, electronic device 102-1 and/or electronic device 102-*m* include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. For example, content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
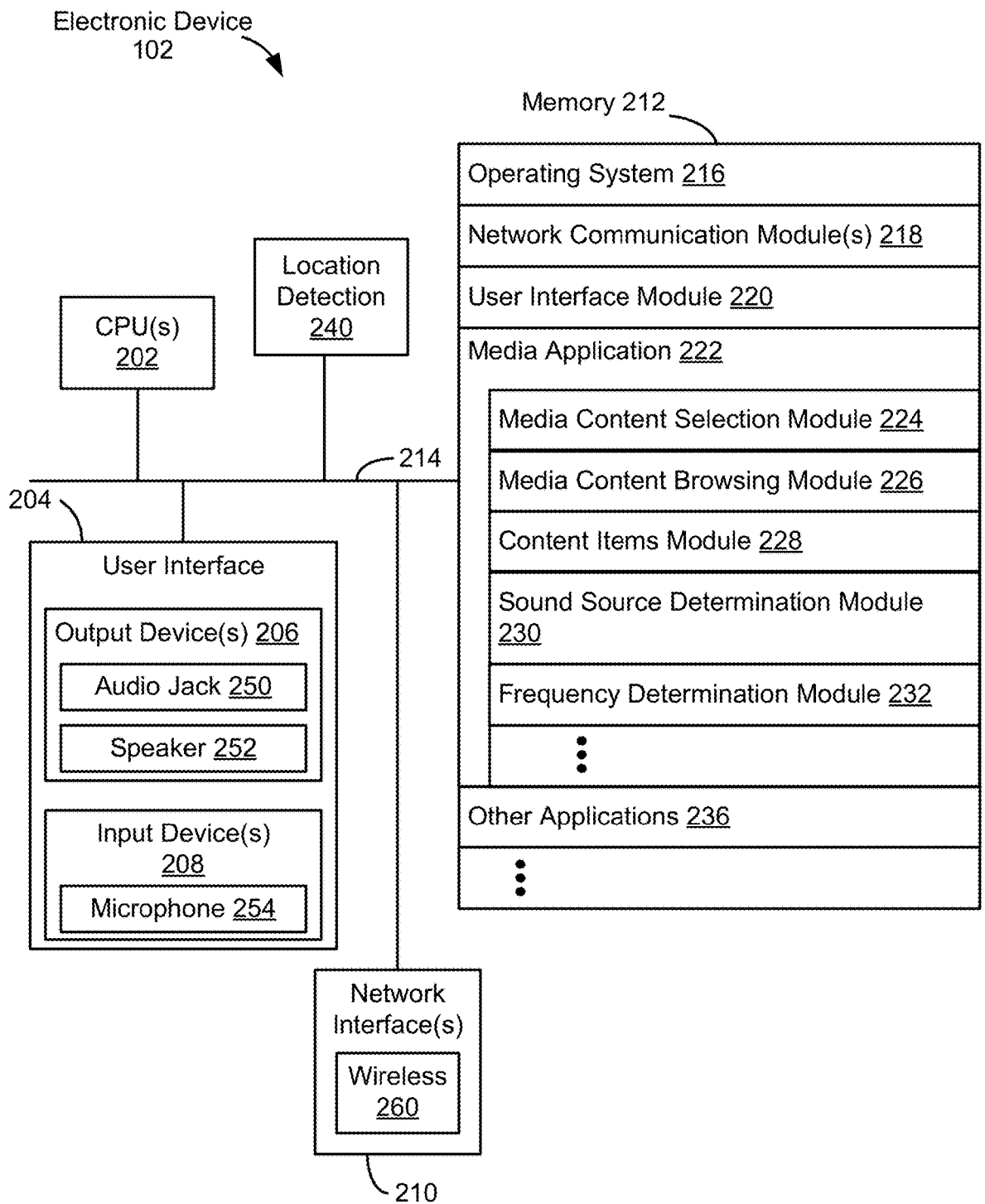
FIG. 2 is a block diagram illustrating a client device, in accordance with some embodiments.

FIG. 2 is a block diagram illustrating an electronic device 102 (e.g., electronic device 102-1 and/or electronic device 102-*m*, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone 254 and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:
  - a media content selection module 224 for selecting one or more media content items and/or sending, to the media content server, an indication of the selected media content item(s);
  - a media content browsing module 226 for providing controls and/or user interfaces enabling a user to navigate, select for playback, and otherwise control or interact with media content, whether the media content is stored or played locally or remotely;
  - a content items module 228 for processing uploaded media items and storing media items for playback and/or for forwarding to the media content server;
  - a sound source determination module 230 for separating a sound source from mixture audio (e.g., that includes vocal and non-vocal portions); and
  - a frequency determination module 232 for tracking and/or determining one or more pitches (e.g., frequencies) of the mixture audio; and
- other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
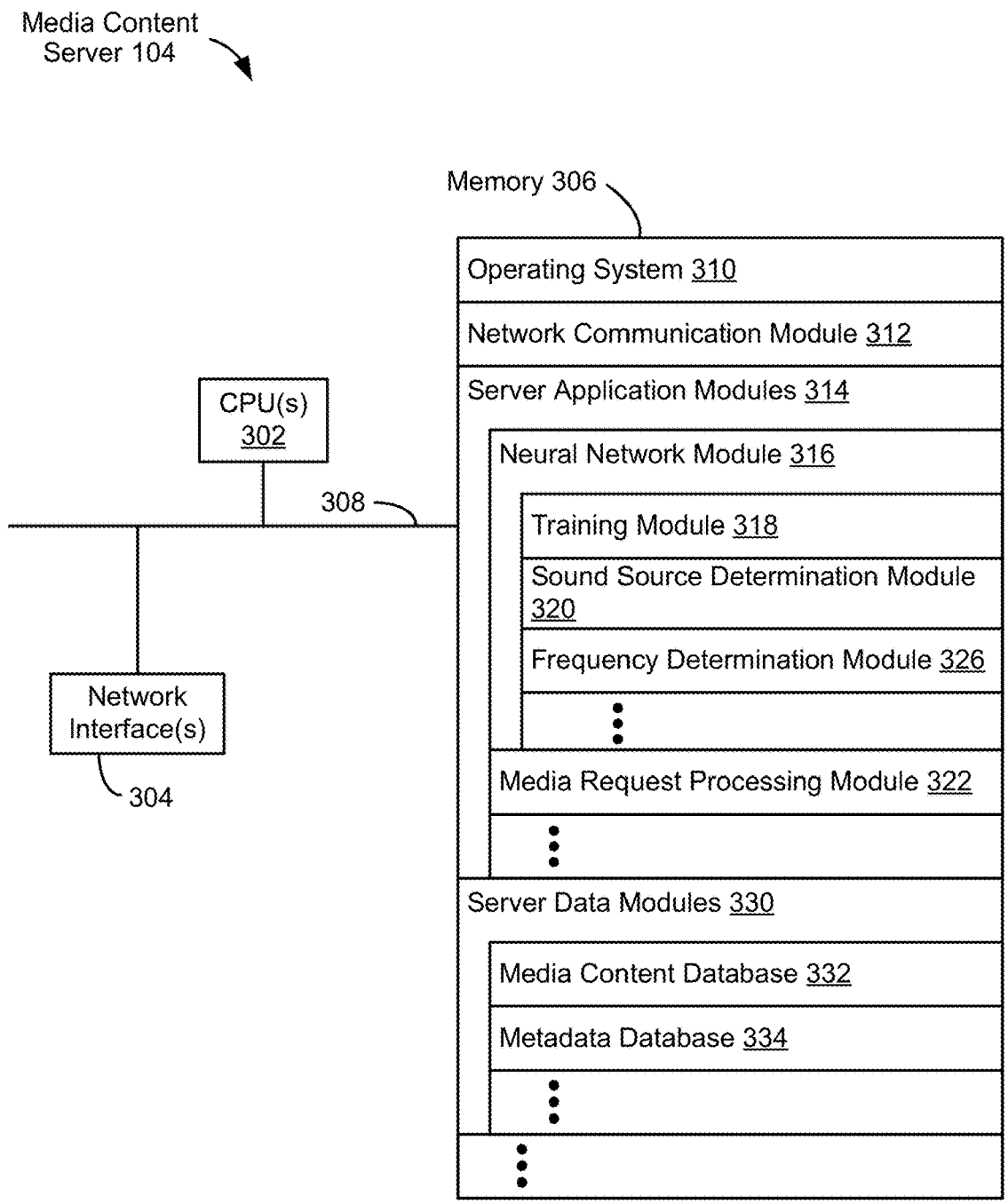
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
one or more server application modules 314 including, but not limited to, one or more of:
a neural network module 316 for training and/or storing a neural network, the neural network module 316 including, but not limited to, one or more of:
a training module 318 for training the neural network (e.g., using training data);
a sound source determination module 320 for isolating a sound source from mixture audio (e.g., that includes vocal and non-vocal portions); and
a frequency determination module 326 for determining frequency data associated with the isolated sound source.
a media request processing module 322 for processing requests for media content and facilitating access to requested media items by electronic devices (e.g., the electronic device 102) including, optionally, streaming media content to such devices;
one or more server data module(s) 330 for handling the storage of and/or access to media items and/or metadata relating to the media items; in some embodiments, the one or more server data module(s) 330 include:
a media content database 332 for storing media items; and
a metadata database 334 for storing metadata relating to the media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Figure 5A:
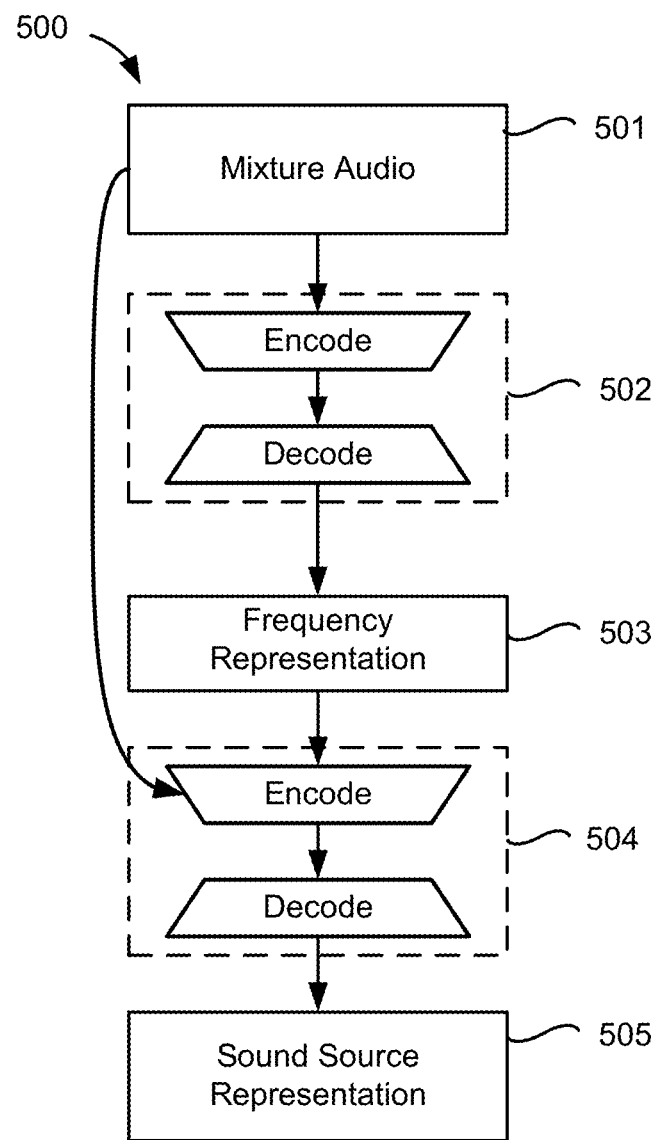
FIGS. 5A-5B illustrate joint models for isolating a sound source and frequencies from audio content in accordance with some embodiments.
Figure 5B:
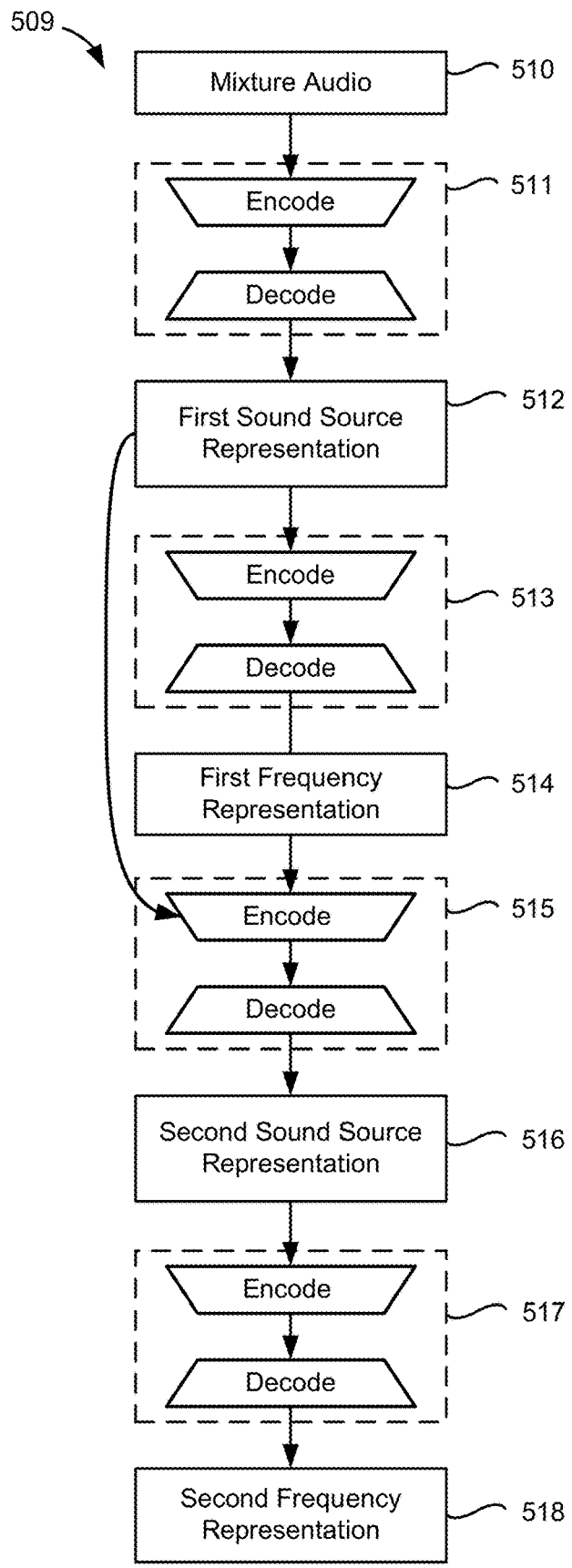

In some embodiments, the sound source determination module 230 and the frequency determination module 232 are jointly trained (e.g., within a common model, such as model 509, FIG. 5B).

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores a subset or superset of the respective modules and data structures described with regard to memory 306. In some embodiments, memory 306 stores a subset or superset of the respective modules and data structures described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
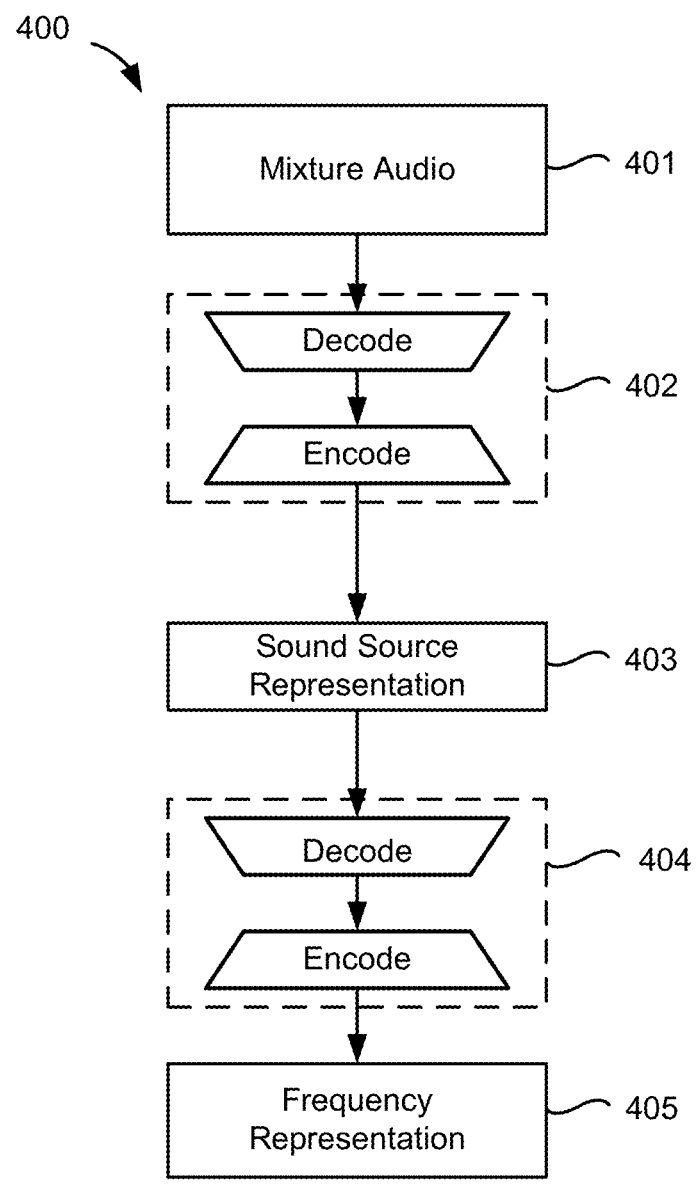
FIG. 4 is a block diagram illustrating a separately trained model for isolating a sound source and frequencies from audio content, in accordance with some embodiments.

FIGS. 4, 5A, and 5B illustrate three different approaches for jointly performing sound source isolation and estimation of frequency data associated with the isolated sound source. FIG. 4 illustrates a first model 400 for determining a sound source representation and a frequency representation, where the frequency representation is determined using the sound source representation as an input. FIG. 5A illustrates a second model 500 for determining a frequency representation and a sound source representation, where the sound source representation is determined using the frequency representation and a mixture audio representation as inputs. FIG. 5B illustrates a third model 509 for determining two sound source representations and two frequency representations.

FIG. 4 is a block diagram illustrating a model 400 for a "Source to Pitch" approach to jointly determining a sound source representation 403 and a frequency representation 405, in accordance with some embodiments. For example, model 400 receives mixture audio 401, which is a representation of an audio item (e.g., a representation of mixed audio) that includes multiple portions (e.g., lead vocal, backup vocal, guitar, bass, piano, and drum portions). The model 400 separates (e.g., using a neural network) a first sound source portion (e.g., a vocal portion) from the audio item to generate a sound source representation 403. The model 400 uses the separated sound source portion from the audio item to determine (e.g., using a neural network) frequencies that are present in the separated sound source portion. The model outputs the determined frequency data as frequency representation 405.

In some embodiments, the model 400 comprises two neural networks (e.g., each neural network comprises a U-Net). For example, model 400 includes neural network 402 and neural network 404. In some embodiments, the system uses the neural network(s) to determine, from mixture audio 401 (e.g., a mixture of vocal and non-vocal content), a sound source representation 403. For example, the sound source representation 403 includes a vocal track that has been separated from the non-vocal (e.g., instrumental) portions of the mixture audio 401. In some embodiments, the mixture audio 401 is stored in media content database 332. In some embodiments, the mixture audio is stored as content items 228. In some embodiments, the neural network processes content as it is added to the database and/or in response to a request to process a particular media content item.

Figure 6:
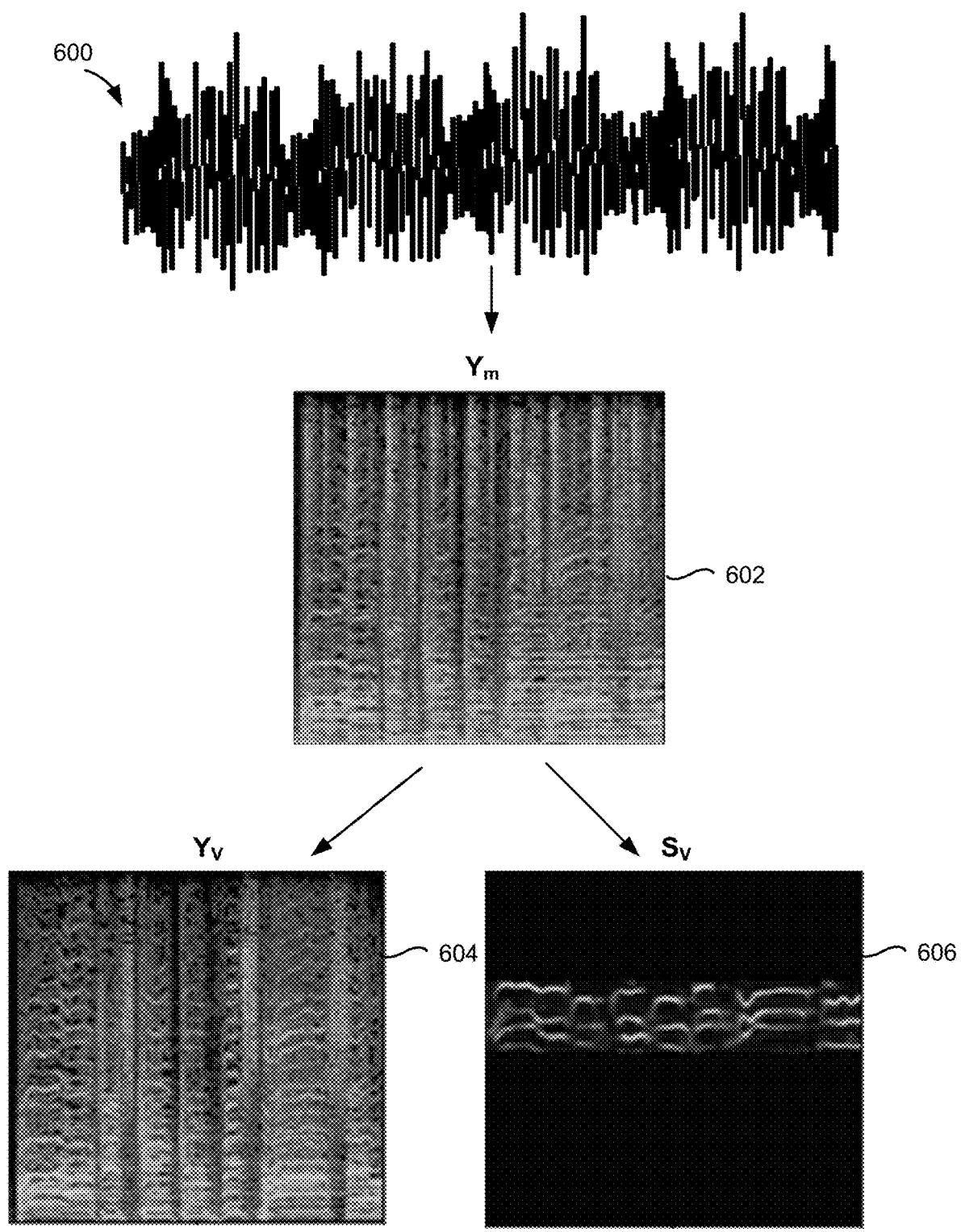
FIG. 6 illustrate representations from audio content, in accordance with some embodiments.

In some embodiments, the model 400 uses the output (e.g., sound source representation 403) from the first neural network 402 as an input for a second neural network 404. In some embodiments, the second neural network 404 determines a frequency representation 405. In some embodiments, frequency representation 405 represents one or more pitches that are included in the mixture audio 401. Examples of a sound source representation and a frequency representation are shown in FIG. 6.

In some embodiments, each neural network (e.g., neural network 402 and neural network 404) in the model 400 performs decoding and encoding in a U-net. For example, decoding includes downsampling (e.g., by performing convolutions) the input to the neural network and encoding includes upsampling the downsampled result to generate the output of the neural network.

In some embodiments, the model 400 first determines (e.g., using neural network 402) sound source representation 403 from the mixture audio. For example, the model 400 separates source audio (e.g., a vocal track) from the mixture audio.

In some embodiments, determining the source (e.g., vocals) is performed separately from determining frequencies. For example, the neural network 402 is trained separately from the neural network 404. The second neural network 404 receives, as an input, the output of the first neural network 402. For example, the sound source representation 403 output by the first neural network is fed to the second neural network. In some embodiments, the neural networks (e.g., the weights for each neural network) are trained separately. For example, the optimization for network 402 is performed separately from the optimization for network 404.

FIG. 5A is a block diagram illustrating a model 500 for a "Pitch to Source" approach to jointly determining a frequency representation 503 and a sound source representation 505. In some embodiments, model 500 includes two neural networks: a first neural network 502 and a second neural network 504. In some embodiments, the two neural networks are optimized jointly (e.g., together). For example, the weights (e.g., and outputs) for each neural network are calculated and/or updated simultaneously (e.g., during training of the neural network).

In some embodiments, the first neural network 502 receives mixture audio 501 (e.g., a representation of mixture audio 501, such as FFT 602 (FIG. 6)) as an input. For example, mixture audio 501 includes vocal and non-vocal portions. The first neural network outputs a frequency (e.g., pitch) representation 503 of the mixture audio 501.

In some embodiments, the frequency representation 503 is fed (e.g., as an input) to the second neural network 504. In some embodiments, mixture audio 501 is also fed (e.g., as an input) to the second neural network 504. For example, frequency representation 503 and mixture audio 501 are provided over separate channels as inputs to the second neural network 504. The second neural network 504 uses the frequency representation 503 input and the mixture audio 501 input to generate (e.g., and output) a sound source representation 505. As explained above, the weights of neural network 504 are trained simultaneously with the weights of neural network 502.

In some embodiments, frequency representation 503 represents one or more pitches that are present in the mixture audio 501 and sound source representation 505 represents sound sources that have been separated from the mixture audio (e.g., vocals that have been extracted from mixture audio 501).

FIG. 5B is a block diagram illustrating a model 509 for a "Source to Pitch to Source to Pitch" approach to jointly determining a frequency representation and a sound source representation. The model 509 includes two iterations of sound source and frequency determinations.

In some embodiments, the first iteration (e.g., including neural network 511 and neural network 513) uses the mixed audio to calculate a pitch output (e.g., first frequency representation 514) and a sound source separation output (e.g., first sound source representation 512). For example, the first iteration first performs a separation using neural network 511 to extract first sound source representation 512. Then, pitch tracking is performed using neural network 513 on the first sound source representation 512 (e.g., as an input to neural network 513).

In some embodiments, the second iteration performs, using neural network 515, a second sound source separation to output second sound source representation 516. For example, the second iteration uses the already determined first sound source representation 512 as an input to the neural network 515. The separated sound sources (e.g., first sound source representation 512) are further refined using neural network 515 to generate a cleaner version of separated sound sources (e.g., second sound source representation 516). In some embodiments, the first sound source representation includes noise from the mixture audio (e.g., the first sound source representation is not a completely clean version of the separated sound source track), and the second sound source representation is generated by removing at least a portion of the noise in the first sound source representation. For example, the second sound source representation is a cleaner version of the first sound source representation.

In some embodiments, the neural network 515 uses the first sound source representation 512 and the first frequency representation 514 as inputs to generate (e.g., output) the second sound source representation 516. In some embodiments, the second sound source representation 516 is fed as an input to neural network 517 and a second frequency representation 518 is output.

In some embodiments, the second sound source representation 516 and the second frequency representation 518 are cleaner versions of a separated sound source and pitch tracking, respectively, than the first sound source representation 512 and the first frequency representation 514.

In some embodiments, the neural networks 511, 513, 515, and 517 are simultaneously (e.g., jointly) optimized. For example, each neural network includes a set of weights. The set of weights for the neural networks are jointly determined during training of the model 509. In some embodiments, the weights for each neural network are distinct. The neural network 511 is optimized to output a first sound source representation 512 that the model will also use for pitch tracking (to determine first frequency representation 514) and that will be used for the second iteration (e.g., to generate the second sound source representation and the second frequency representation). By training the model 509 (e.g., the plurality of neural networks in the model) simultaneously, the outputs of model 509 (e.g., second sound source representation 516 and second frequency representation 518) are optimized. For example, joint learning optimizes both source separation (e.g., to generate sound source representations) and pitch tracking (e.g., to generate frequency representations) because information about the pitch and sound sources are learned at the same time, and this information can be used to generate better (e.g., more accurate) sound source representation(s) and/or frequency representation(s).

In some embodiments, each of the representations (e.g., sound source representations and frequency representations)

corresponds to a matrix (e.g., that can be illustrated by a fast Fourier transform diagram, as described with reference to FIG. 6).

In some embodiments, network 515 receives the matrices (e.g., over different channels) as two separate inputs. For example, neural network 515 receive a matrix representing first sound source representation 512 over a first channel and receives a matrix representing first frequency representation 514 over a second channel.

In some embodiments, more than two iterations are performed. For example, a third sound source representation and/or a third frequency representation are determined using additional neural networks.

In some embodiments, the order of the neural networks is changed. For example, a first frequency representation 514 is used as an input for a neural network determining a first sound source representation 512 (e.g., determining, using a first neural network, a frequency representation before determining, using a second neural network, a sound source representation).

In some embodiments, the model 509 (e.g., and/or model(s) 400 or 500) is repeatedly retrained with additional data. For example, a first training set of data is used to train model 509. Mixture audio 510 is then classified (e.g., to determine second sound source representation 516 and second frequency representation 518) using the trained model 509. In some embodiments, the model 509 is retrained (e.g., to adjust the weights of the neural networks in the model) using a second training set of data. In some embodiments, the second training set of data comprises data provided by a user. For example, a user determined (e.g., by the electronic device) to have good pitch control (e.g., based on prior data and/or performances by the user) sings (e.g., while performing karaoke) an audio content item. The frequencies of the user's voice are recorded and stored (e.g., by the electronic device 102 and/or server system 104) as frequency data associated with the audio content item. The stored frequency data is used in the second training set of data (e.g., to update the weights of the neural network).

FIG. 6 illustrates representations of a media content item. In some embodiments, a media content item 600 is represented by a mixture audio matrix ("Ym"). For example, the mixture audio matrix is transformed into a fast Fourier transform (FFT) spectrogram (e.g., mixture audio representation 602). The mixture audio representation 602 represents, over a period of time, a distribution of frequencies and amplitudes of audio signals for the mixture audio (e.g., including vocal and non-vocal sources). In some embodiments, the non-vocal sources comprise instruments.

The vocal representation 604 ("YV") is generated, from mixture audio representation 602, by separating audio, from the mixture audio, that corresponds to a vocal source. The separated audio that corresponds to a vocal source is illustrated by an FFT spectrogram shown in vocal representation 604.

In some embodiments, frequency representation 606 is generated from mixture audio representation 602. In some embodiments, frequency representation 606 corresponds to pitches of vocal sources represented in vocal representation 604. For example, frequency representation 606 provides a likelihood that a particular frequency (or frequencies) is dominant at respective points in time. Frequency representation 606 illustrates an amplitude and/or volume of pitch values over time. To represent a plurality of frequencies in the frequency representation, within the matrix for the frequency representation 606, for a respective time, more than one value in the matrix is greater than zero.

In some embodiments, vocal representation 604 and frequency representation 606 are generated using model 500 (FIG. 5A) or model 509 (FIG. 5B). For example, vocal representation 604 corresponds to second sound source representation 516 and frequency representation 606 corresponds to second frequency representation 518, as generated using model 509.

In some embodiments, frequency representation 606 includes a plurality of dominant frequencies (e.g., each dominant frequency corresponding to a distinct vocal source). For example, mixture audio 600 includes a plurality of distinct vocal sources (e.g., multiple vocalists). Frequency representation 606 illustrates at least 3 distinct sources of the pitches.

Figure 7A:
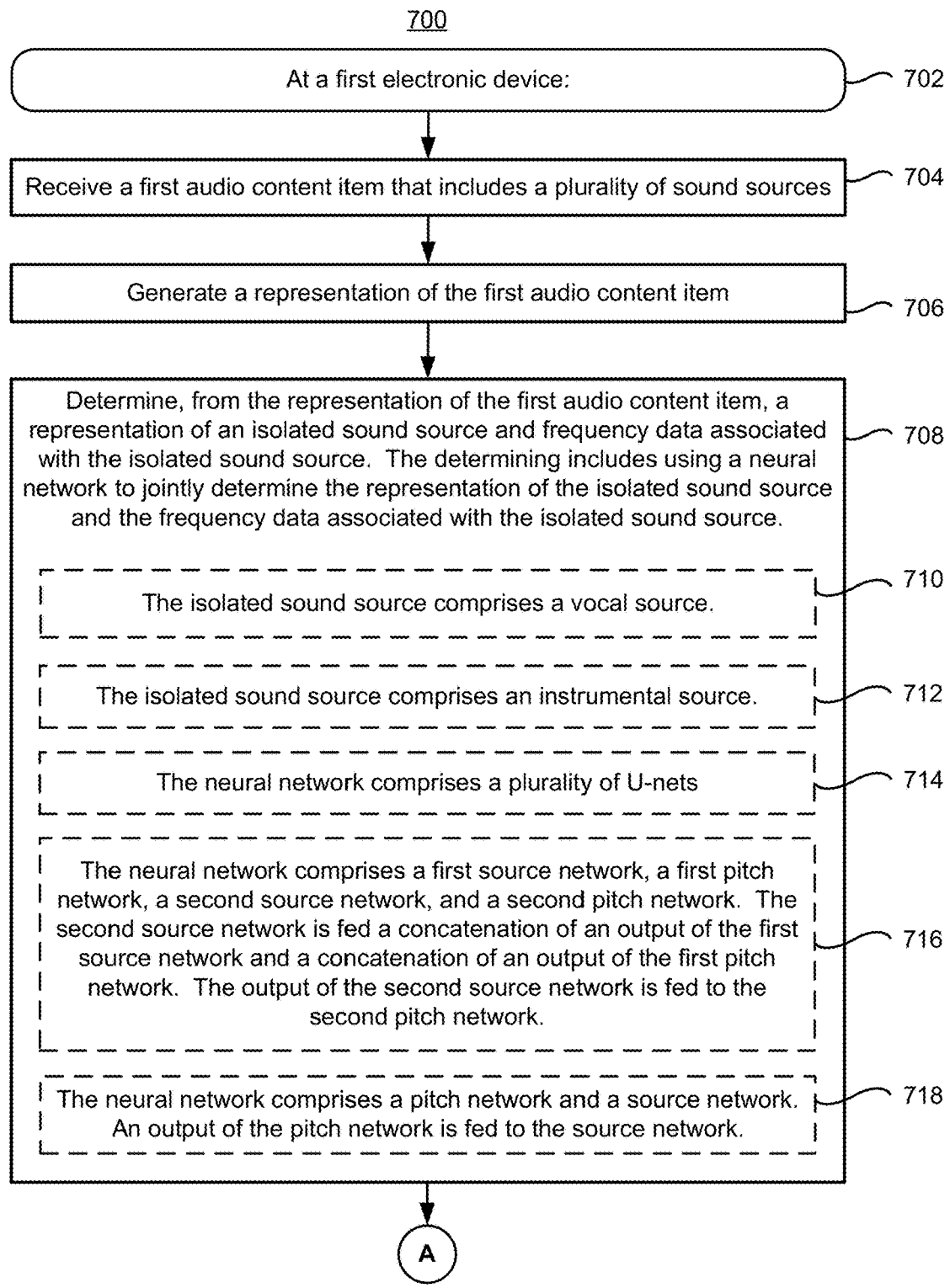
FIGS. 7A-7B are flow diagrams illustrating a method of jointly determining an isolated sound source and frequency data for an audio item, in accordance with some embodiments.
Figure 7B:
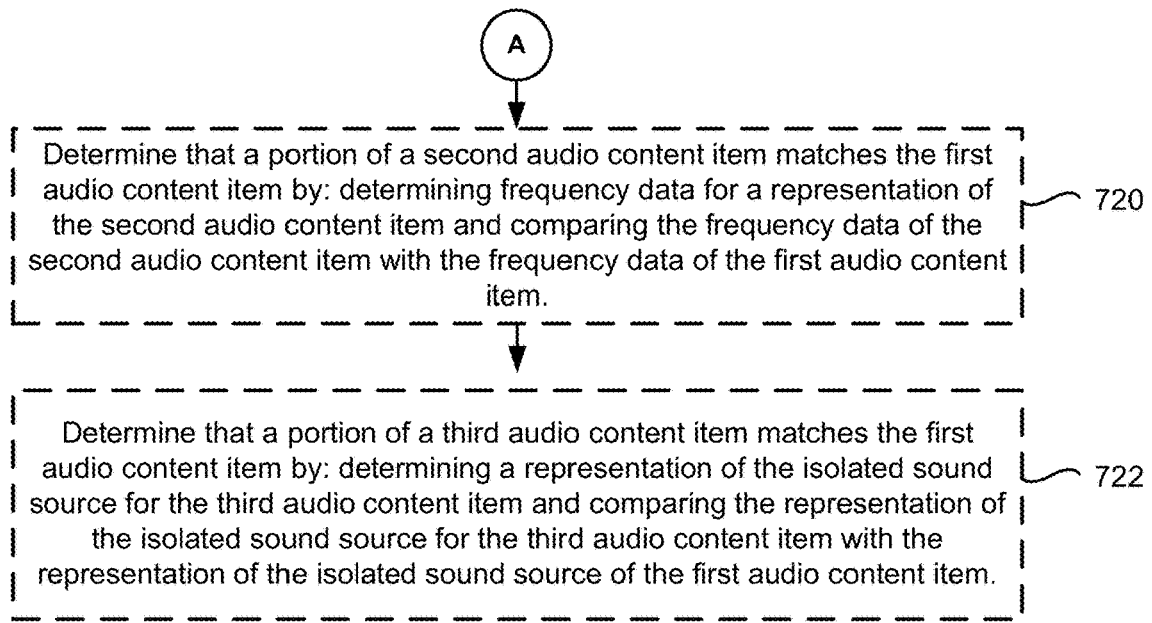

FIGS. 7A-7B are flow diagrams illustrating a method 700 for identifying a first sequence of characters based on a generated probability matrix, in accordance with some embodiments. Method 700 may be performed (702) at a first electronic device (e.g., server 104 and/or electronic device 102-1, the electronic device having one or more processors and memory storing instructions for execution by the one or more processors. In some embodiments, the method 700 is performed by executing instructions stored in the memory (e.g., memory 306, FIG. 3 and/or memory 212, FIG. 2) of the electronic device. In some embodiments, the method 700 is performed by a combination of the server system (e.g., including media content server 104 and CDN 106) and an electronic device (e.g., a client device). In some embodiments, the server system provides tracks (e.g., media items) for playback to the electronic device(s) 102 of the media content delivery system 100.

Referring now to FIG. 7A, in performing the method 700, the electronic device receives (704) a first audio content item that includes a plurality of sound sources. In some embodiments, the plurality of sound sources includes one or more vocal sources and/or one or more instrumental sources.

The electronic device generates (706) a representation (e.g., a magnitude spectrogram) of the first audio content item. For example, as shown in FIG. 6, the representation of mixture audio (Ym) 602 illustrates a magnitude spectrogram of the first audio content item 600. In some embodiments, the representation of the first audio content item is generated by an optical spectrometer, a bank of band-pass filters, by Fourier transform, or by a wavelet transform.

The electronic device determines (708), from the representation of the first audio content item, a representation of an isolated sound source, and frequency data associated with the isolated sound source. In some embodiments, the isolated sound source is a sound source of the plurality of sound sources included in the first audio content item. For example, as shown in FIG. 6, a representation of the isolated sound source (e.g., vocals) is represented by Yv 604. The frequency data is represented by Sv 606.

The determining includes using a neural network to jointly determine the representation of the isolated sound source and the frequency data associated with the isolated sound source. For example, as shown in FIGS. 5A-5B, models 500 and 509 include one or more neural networks used to determine the one or more sound source representations and the one or more frequency representations.

In some embodiments, the isolated sound source comprises (710) a vocal source. For example, the electronic device separates a vocal track from the mixed audio item.

In some embodiments, the isolated sound source comprises (712) an instrumental (e.g., a non-vocal, drums, guitar, bass, etc.) source. For example, the electronic device separates an instrumental source from a vocal source of the mixture audio.

In some embodiments, the neural network comprises (714) a plurality of U-nets. For example, as shown in FIGS. 4, 5A and 5B, each neural network corresponds to a U-net, including encoding and decoding stages.

In some embodiments, the neural network comprises (716) a first source network, a first pitch network, a second source network, and a second pitch network. The second source network is fed a concatenation of an output of the first source network with an output of the first pitch network, and the output of the second source network is fed to the second pitch network. For example, model 509 shown in FIG. 5B illustrates that the first source network 511 outputs first sound source representation 512 (e.g., the output of the first source network). The first pitch network 513 outputs first frequency representation 514. These outputs (e.g., first sound source representation 512 and first frequency representation 514) are fed as inputs to the second source network 515. The output of the second source network 515 (e.g., second sound source representation 516) is fed to the second pitch network 517 to generate the second frequency representation 518.

In some embodiments, the neural network comprises (718) a pitch network and a source network, and an output of the pitch network is fed to the source network. For example, FIG. 5A illustrates a neural network model 500 having a first (e.g., pitch) network 502 and a second (e.g., source) network 504 that is fed an output (e.g., frequency representation 503) from the first source network.

In some embodiments, the first electronic device determines (720) that a portion of a second audio content item matches the first audio content item by determining frequency data associated with (e.g., for) a representation of the second audio content item and comparing the frequency data associated with (e.g., of) the second audio content item with the frequency data of the first audio content item. For example, the first electronic device receives a second audio content item (e.g., distinct from mixture audio 510), and uses the model 509 to determine one or more frequency representations (e.g., and/or one or more sound source representations) for the second audio content item. In some embodiments, the second audio content item (e.g., and/or third audio content item) is received from content items 228 or media content database 332. In some embodiments, the second audio content item is provided by a user (e.g., uploaded to the electronic device). The electronic device compares the frequency representation(s) determined for the second audio content item with the frequency representation(s) determined for the first audio content item. For example, two media content items are identified as matching when the items share one or more pitches (e.g., over a predefined time period). Without matching a vocal representation, instrumental cover songs (e.g., a cello playing a song without singing lyrics) are identified as matching the original song that also included vocals (e.g., instead of purely instrumentals).

In some embodiments, the first electronic device determines (722) that a portion of a third audio content item matches the first audio content item by determining a representation of the isolated sound source for the third audio content item and comparing the representation of the isolated sound source for the third audio content item with the representation of the isolated sound source of the first audio content item. For example, the first electronic device receives a third audio content item (e.g., distinct from mixture audio 510), and uses the model 509 to determine one or more sound source representations and one or more frequency representations for the third audio content item. The electronic device compares the sound source representation(s) and the frequency representation(s) determined for the third audio content item with the sound source representation(s) and frequency representation(s) determined for the first audio content item. The electronic device determines that the first audio content item and the third audio content item are related in accordance with a determination that at least a portion of the sound source representation(s) of the first and third audio content items match and/or at least a portion of the frequency representation(s) of the first and third audio content items match, enabling the electronic device to identify the third audio content item as a cover song that includes a different sound source (e.g., a different artist than the first audio content item).

In some embodiments, the electronic device determines (e.g., classifies) the first audio content item corresponds to a particular genre based on the sound source representation and/or frequency representation.

In some embodiments, the electronic device aligns the frequency representation (e.g., Sv, FIG. 6) with playback of the first audio content item. For example, the electronic device displays a pitch tracking tool to provide a user with pitch information for respective portions of the audio content item. The pitch tracking tool enables a user to sing along (e.g., in a karaoke setting) with playback of the first audio content item and receive feedback on how the user's vocal input compares with the determined frequencies (e.g., pitches) of the first audio content item (e.g., as determined by the neural network). For example, the frequency representation (as determined by the neural network) corresponds to a target pitch that the user should attempt to match while singing along.

In some embodiments, generating the representation of the first audio content item comprises determining a first set of weights for a source network of a source to pitch network, feeding a pitch network of the source to pitch network an output of the source network of the source to pitch network, and determining a second set of weights for the pitch network of the source to pitch network. For example, a "Source to Pitch" network is shown in model 400 in FIG. 4. The output of the source network of the source to pitch network (e.g., network 402) is used as an input to the pitch network of the source to pitch network (e.g., network 404). In some embodiments, the source network is the same as the first source network.

In some embodiments, the neural network model is trained (e.g., before determining the representation of the isolated sound source and frequency data). For example, training the neural net includes generating a first set of weights corresponding to the isolated sound source, generating a second set of weights corresponding to the frequency data, and using the first set of weights and the second set of weights as input to a second source representation model. In some embodiments, the first set of weights, second set of weights, third set of weights, and fourth set of weights are determined concurrently. In some embodiments, the sets of weights are optimized. In some embodiments, the neural network is retrained using additional (e.g., different) training data.

Although FIGS. 7A-7B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
   at a first electronic device, the first electronic device having one or more processors and memory storing instructions for execution by the one or more processors:
   receiving a first audio content item that includes a plurality of sound sources;
   generating a representation of the first audio content item; and
   determining, from the representation of the first audio content item:
   a representation of an isolated sound source, and
   frequency data associated with the isolated sound source, wherein the step of determining the representation of the isolated sound source and the frequency data associated with the isolated sound source includes using a neural network system to jointly determine the representation of the isolated sound source using a first neural network and the frequency data associated with the isolated sound source using a second neural network, wherein weights of the first neural network and weights of the second neural network are trained simultaneously; and
   determining that a portion of a second audio content item matches the first audio content item using the representation of the isolated sound source or the frequency data associated with the isolated sound source.

2. The method of claim 1, wherein determining that the portion of the second audio content item matches the first audio content item includes:
   determining frequency data for a representation of the second audio content item; and
   comparing the frequency data of the second audio content item with the frequency data of the first audio content item.

3. The method of claim 1, wherein determining that the portion of the second audio content item matches the first audio content item includes:
   determining a representation of the isolated sound source for the second audio content item; and
   comparing the representation of the isolated sound source for the second audio content item with the representation of the isolated sound source of the first audio content item.

4. The method of claim 1, wherein the neural network system comprises a plurality of U-nets.

5. The method of claim 1, wherein:
   the neural network system comprises a first source network, a first pitch network, a second source network, and a second pitch network,
   the second source network is fed a concatenation of an output of the first source network with an output of the first pitch network, and
   the output of the second source network is fed to the second pitch network.

6. The method of claim 1, wherein generating the representation of the first audio content item comprises:
   determining a first set of weights for a source network of a source-to-pitch network;
   feeding a pitch network of the source-to-pitch network an output of the source network of the source-to-pitch network; and
   determining a second set of weights for the pitch network of the source-to-pitch network.

7. The method of claim 1, wherein the isolated sound source comprises a vocal source.

8. The method of claim 1, wherein the isolated sound source comprises an instrumental source.

9. A first electronic device comprising:
   one or more processors; and
   memory storing instructions for execution by the one or more processors, the instructions including instructions for:
   receiving a first audio content item that includes a plurality of sound sources;
   generating a representation of the first audio content item; and
   determining, from the representation of the first audio content item:
   a representation of an isolated sound source, and
   frequency data associated with the isolated sound source, wherein the step of determining the representation of the isolated sound source and the frequency data associated with the isolated sound source includes using a neural network system to jointly determine the representation of the isolated sound source using a first neural network and the frequency data associated with the isolated sound source using a second neural network, wherein weights of the first neural network and weights of the second neural network are trained simultaneously; and
   determining that a portion of a second audio content item matches the first audio content item using the representation of the isolated sound source or the frequency data associated with the isolated sound source.

10. The first electronic device of claim 9, wherein determining that the portion of the second audio content item matches the first audio content item includes:
    determining frequency data for a representation of the second audio content item; and
    comparing the frequency data of the second audio content item with the frequency data of the first audio content item.

11. The first electronic device of claim 9, wherein determining that the portion of the second audio content item matches the first audio content item includes:
    determining a representation of the isolated sound source for the second audio content item; and
    comparing the representation of the isolated sound source for the second audio content item with the representation of the isolated sound source of the first audio content item.

12. The first electronic device of claim 9, wherein the neural network system comprises a plurality of U-nets.

13. The first electronic device of claim 9, wherein:
the neural network system comprises a first source network, a first pitch network, a second source network, and a second pitch network,
the second source network is fed a concatenation of an output of the first source network with an output of the first pitch network, and
the output of the second source network is fed to the second pitch network.

14. The first electronic device of claim 9, wherein generating the representation of the first audio content item comprises:
determining a first set of weights for a source network of a source-to-pitch network;
feeding a pitch network of the source-to-pitch network an output of the source network of the source-to-pitch network; and
determining a second set of weights for the pitch network of the source-to-pitch network.

15. The first electronic device of claim 9, wherein the isolated sound source comprises a vocal source.

16. The first electronic device of claim 9, wherein the isolated sound source comprises an instrumental source.

17. A non-transitory computer-readable storage medium storing instructions, which when executed by an electronic device, cause the electronic device to:
receive a first audio content item that includes a plurality of sound sources;
generate a representation of the first audio content item; and
determine, from the representation of the first audio content item:
a representation of an isolated sound source, and
frequency data associated with the isolated sound source, wherein the step of determining the representation of the isolated sound source and the frequency data associated with the isolated sound source includes using a neural network system to jointly determine the representation of the isolated sound source using a first neural network and the frequency data associated with the isolated sound source using a second neural network, wherein weights of the first neural network and weights of the second neural network are trained simultaneously; and
determine that a portion of a second audio content item matches the first audio content item using the representation of the isolated sound source or the frequency data associated with the isolated sound source.

18. The non-transitory computer-readable storage medium of claim 17, wherein determining that the portion of the second audio content item matches the first audio content item includes:
determining frequency data for a representation of the second audio content item; and
comparing the frequency data of the second audio content item with the frequency data of the first audio content item.

19. The non-transitory computer-readable storage medium of claim 17, wherein determining that the portion of the second audio content item matches the first audio content item includes:
determining a representation of the isolated sound source for the second audio content item; and
comparing the representation of the isolated sound source for the second audio content item with the representation of the isolated sound source of the first audio content item.

20. The non-transitory computer-readable storage medium of claim 17, wherein the neural network system comprises a plurality of U-nets.

* * * * *